United States Patent
Rantanen et al.

(10) Patent No.: US 8,498,265 B2
(45) Date of Patent: Jul. 30, 2013

(54) ENABLING SETTINGS PROVISIONING PROCESS IN WIMAX NETWORKS

(75) Inventors: Tommi O. Rantanen, Tampere (FI); Jukka Ala-Vannesluoma, Tampere (FI); Jani Hirsimäki, Tampere (FI); Ilkka Oksanen, Tampere (FI); Mikko Tasa, Tampere (FI)

(73) Assignee: Nokia Corporation, Espoo (FI)

( * ) Notice: Subject to any disclaimer, the term of this patent is extended or adjusted under 35 U.S.C. 154(b) by 980 days.

(21) Appl. No.: 11/987,761

(22) Filed: Dec. 4, 2007

(65) Prior Publication Data

US 2008/0144590 A1 Jun. 19, 2008

Related U.S. Application Data

(60) Provisional application No. 60/874,729, filed on Dec. 14, 2006, provisional application No. 60/902,858, filed on Feb. 23, 2007.

(51) Int. Cl.
*H04W 4/00* (2009.01)

(52) U.S. Cl.
USPC .......................................... 370/331

(58) Field of Classification Search
USPC .......... 370/338, 331, 277, 342, 350; 455/406, 455/420, 456.1, 404; 709/220, 223, 219, 709/221
See application file for complete search history.

(56) References Cited

U.S. PATENT DOCUMENTS

| | | | |
|---|---|---|---|
| 2003/0101246 A1* | 5/2003 | Lahti | 709/221 |
| 2004/0106433 A1* | 6/2004 | Ooki et al. | 455/561 |
| 2005/0138144 A1 | 6/2005 | Sethi | |
| 2005/0233740 A1* | 10/2005 | Jiang | 455/432.1 |
| 2005/0265360 A1 | 12/2005 | Kim et al. | |
| 2006/0274743 A1 | 12/2006 | Yegin et al. | |
| 2008/0026740 A1* | 1/2008 | Netanel | 455/419 |
| 2008/0126555 A1* | 5/2008 | Rao | 709/230 |

FOREIGN PATENT DOCUMENTS

| | | |
|---|---|---|
| EP | 1 705 872 A1 | 9/2006 |
| WO | WO 00/18066 | 3/2000 |
| WO | WO 2006/018707 A1 | 2/2006 |

OTHER PUBLICATIONS

S. Alexander RFC 2132; "DHCP Options & BOOTP Vendor Extensions"; Mar. 1997; pp. 1-34.
C. Perkins RFC 3220; "IP Mobility Support for IPv4"; Aug. 2002; pp. 1-99.
International Search Report, PCT/EP2007/063607 filed Dec. 10, 2007.

* cited by examiner

*Primary Examiner* — Dady Chery
(74) *Attorney, Agent, or Firm* — Harrington & Smith

(57) ABSTRACT

Embodiments of the present invention provide a method and apparatus for enabling a subscriber station to start a settings provisioning process in a WiMAX system. The method includes receiving a request from a subscriber station, the request requesting information for enabling the subscriber station to begin a settings provisioning process. A bootstrap document is then fetched, and a response is transmitted to the subscriber station. The response includes the bootstrap document and the bootstrap document includes the information for enabling the subscriber station to begin the settings provisioning process.

25 Claims, 5 Drawing Sheets

ENABLING SETTINGS PROVISIONING PROCESS IN WIMAX NETWORKS

CROSS-REFERENCE TO RELATED APPLICATION

This application claims priority of U.S. Provisional Patent Application Ser. No. 60/902,858, filed Feb. 23, 2007, and Provisional Application Ser. No. 60/874,729, filed Dec. 14, 2006. The subject matter of these earlier filed applications is hereby incorporated by reference.

FIELD AND BACKGROUND OF THE INVENTION

The present invention relates to a method of enabling a subscriber station to start a settings provisioning process in a WiMAX (Worldwide Interoperability for Microwave Access) system.

WiMAX system lends itself as a lightweight Internet access technology. It is built on top of 802.16 standard family MAC+PHY (Medium Access Control+Physical layer) standard from IEEE (certified by WiMAX). The system standard (higher layers and network) is standardized and certified by WiMAX Forum.

Open Mobile Alliance (OMA) is a standardization forum. Its aim is to facilitate global user adoption of mobile data services by specifying market driven mobile service enablers that ensure service interoperability across devices, geographies, service providers, operators, and networks, while allowing businesses to compete through innovation and differentiation. For example it has produced specifications for the device management using SyncML (Synchronization Markup Language) (OMA DM (Device Management)), data synchronization using SyncML (OMA DS (Data Synchronization)), multimedia messages (MMS) and device rights management (DRM) features.

Almost all new and existing mobile services require some kind of settings to work properly. It is important that settings provisioning for these services is as automatic as possible because subscriber stations such as mobile devices are small and they have limited user interfaces. Manual configuration as a whole is too complex for most of the users of the subscriber stations. In an optimal case, there are no interactive steps that affect to the end user during the settings provisioning procedure. An assumption in the optimal situation is also that the provisioning works over the air, meaning that there is no need to physically attach the device to anywhere. That leads to best user experience.

Open Mobile Alliance has developed a protocol for this purpose which is called OMA DM. It is an extensible and well defined XML (extended Markup Language) based data transfer protocol which can be used to manage a diverse set of settings in the mobile devices. A device which settings are being managed is called a client and the entity that is responsible for maintaining one or more devices is called a server.

In case of the WiMAX networks OMA DM works over HTTP (HyperText Transfer Protocol) which relies on TCP (Transport Control Protocol). With the help of the default settings and DHCP (Dynamic Host Control Protocol), a newly purchased and un-provisioned WiMAX device can obtain IP (Internet Protocol) connectivity. However, this is not enough to start the provisioning session as OMA DM client has to know IP address and port number of the server. OMA has defined a bootstrap message that contains this information.

In the prior art, bootstrap jobs are disclosed. A bootstrap can occur as part of a manufacture of a device or be initiated by a Device Manager server. A server initiated bootstrap sends out the bootstrap message with a push mechanism. However, the server has to know the device address, phone number, or some other mechanism for communicating with the device before initiating the bootstrap. The bootstrap document can be encrypted to ensure that the document is received from the trusted source.

SUMMARY OF THE INVENTION

The present invention aims at providing a mechanism for providing a client with information about a server, which information enables the client to start a settings provisioning process.

According to embodiments of the invention, means are provided to transport this information to an un-provisioned client or a provisioned client that is roaming and requires new settings related to a visited provider or server.

The invention enables an automated OTA (Over The Air) OMA DM provisioning in the WiMAX networks. Load balancing between DM servers can be also facilitated by sending different bootstrap documents to different clients. Bootstrap document encryption can be done to ensure that the bootstrap document is sent to the terminal from the trusted source.

DESCRIPTION OF THE PREFERRED EMBODIMENTS

Figure 1:
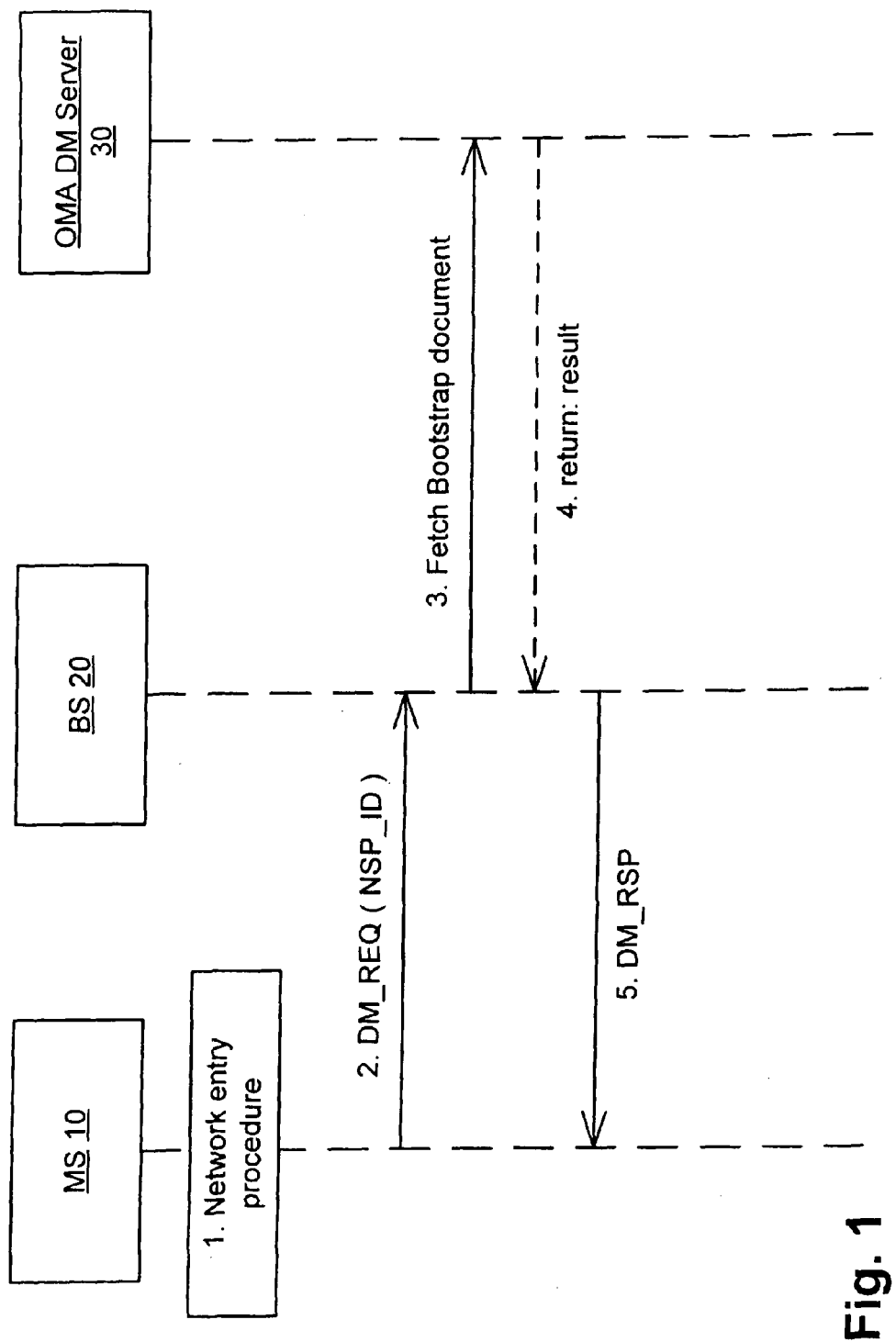
FIG. 1 shows a signaling diagram illustrating a provision of server information according to a first embodiment of the invention.

According to OMA, device management (DM) is management of a device configuration and other managed objects of devices from the point of view of various management authorities. Device management includes, but is not restricted to setting initial configuration information in devices, subsequent updates of persistent information in devices, retrieval of management information from devices and processing events and alarms generated by devices.

OMA DM is an advanced way to manage content and settings in MS (Mobile Station) and includes following parts:
  Protocols: The protocols used between a management server and a mobile device.
  Policy: The policy decides who can manipulate a particular parameter or update a particular object in the device.
  Data: The data offered for remote manipulation (OMA management tree)

OMA DM includes client and server initiated updates (PUSH and PULL). A DM Protocol can use HTTP over general IP connectivity. Supported features may comprise operator specific settings, content download (any binary data, wallpapers, java midlets etc.), firmware updates, and bootstrap which is the process of provisioning the DM client to a state where it is able to initiate a management session to a new DM server.

OMA has defined a bootstrap message that contains information about an IP address and a port number of a server. According to an embodiment of the invention, a mechanism is provided how this message can be conveyed and bootstrapped to an un-provisioned client using WiMAX 802.16 networks, for example. Without the bootstrap message it is not possible to start the OMA DM provisioning process.

According to OMA DM, a server initiated bootstrap is provided. With this scenario, the problem is how the DM server knows the device address or phone number to initiate the bootstrap.

The present invention represents means to transport OMA bootstrap message to un-provisioned SS (subscriber station) or provisioned SS that is roaming and requires new settings related to visited NAP (network access provider) or NSP (network service provider). The subscriber station may comprise a mobile device or mobile station (MS).

The bootstrap document can be encrypted using:
1. Master Session Key (MSK) or EAP Integrity Key (EIK) derived from the WiMAX device authentication procedure;
2. MAC address of the terminal;
3. Some specific and possible unique key inside the device certificate that identifies the device;
4. Network Access Identifier (NAI) that is used with WiMAX authentication;
5. Some other unique key that identifies the device.

In a first embodiment of the invention, for transporting the OMA bootstrap message to the SS a 802.16 MAC (Medium Access Control) message pair is defined which the SS can use to query the bootstrap message. The name of the messages may be for example DM_REQ and DM_RSP. DM_REQ may be an empty message without options. DM_RSP has to contain the bootstrap message. A BS (Base Station) gets the bootstrap message for example from an ASN GW (Access Service Network GateWay) or from its own configuration.

In one aspect of the invention an unsolicited, new or existing, MAC message e.g. DM_RSP or the like can be sent in the network entry phase, when network detects a new device based on MAC address or device certificate or any other means or when the user has finished subscription using operator's web portal. Network can send the unsolicited MAC message to the terminal as a OMA DM Notification. The message may have a TLV (Type Length Value) which identifies the notification type (e.g. Bootstrap, request for creation of DM session) and a TLV for payload data. The message may contain other TLVs which may contain OMA DM specific content and parameters. This trigger could require terminal to start OMA DM session using MAC or upper layers.

Alternative data flow for notification:
1. DMS (Device Management Server) sends notification message to AAA (authentication, authorisation, and accounting server), which forwards the message to ASN-GW, then ASN-GW forwards the message to BS, which then forwards the message to SS.
2. DMS sends notification message to HA (MIP Home Agent), which forwards the message to ASN-GW, then ASN-GW forwards the message to BS, which then forwards the message to SS.
3. DMS sends notification message to ASN-GW, which forwards the message to the BS, which forwards message to SS.
4. DMS sends notification message to some other entity in CSN, which forwards the message to some entity in ASN, which forwards message to SS.
5. DMS sends notification message directly to ANS-GW or some other entity in ASN, which forwards the message to BS, which forwards the message to SS.

FIG. 1 shows a signaling diagram illustrating signaling between a mobile station (MS) 10 as subscriber station, a base station (BS) 20 and an OMA DM server 30 according to the first embodiment.

In a process 1 in FIG. 1, a network entry procedure is performed by the MS 10 in order to get connection to the BS 20. After that, the MS 10 issues a bootstrap message request DM_REQ which may include an ID of a network service provider (NSP) or new TLV to the BS 20 (communication 2 in FIG. 1). If the DM_REQ does not contain the ID of the NSP, the network provides bootstrap document of the home network. If the home network is not known then the request fails.

In a roaming case a TLV (Type Length Value) may be included in the DM_REQ which defines that the terminal is going to roam to the network indicated by the NSP_ID.

In response to receiving the request DM_REQ, the BS 20 may fetch a bootstrap document from the OMA DM server 30 in communications 3 and 4 in FIG. 1. Alternatively, the BS 20 gets the bootstrap document from its own configuration. In a bootstrap message response DM_RSP the BS 20 returns the bootstrap document to the MS 10 in communication 5 in FIG. 1. With the bootstrap document the MS 10 now is able to start the OMA DM provisioning process, i.e. to start an OMA DM session between the OMA DM server 30 and the MS 10.

According to the first embodiment, the MS 10 includes a device for issuing a message requesting information for enabling the MS 10 to start a settings provisioning process. The MS 10 also includes a device for receiving a response message including the information and for extracting the information for enabling the MS 10 to start the settings provisioning process. The request message and the response message are a MAC message pair defined in MAC layer.

Similarly, in the first embodiment, the BS 20 includes a device for receiving the request message and a device for including the information in the response message and sending the response message. The BS 20 may further include a device for retrieving the information from another entity. Similarly, the another entity, e.g. the OMA DM server 30, may include a device for returning the information upon a request for retrieving the information.

In a second embodiment, the bootstrap message is sent as TLV (Type Length Value) inside some existing MAC message during a network entry procedure. An unsolicited existing response message can be sent in the network entry phase, when network detects a new device based on MAC address or device certificate or any other means or when the user has finished subscription using operator's web portal Alternative data flow for notification:
1. DMS (Device Management Server) sends notification message to AAA, which forwards the message to ANS-GW, then ASN-GW forwards the message to BS, which then forwards the message to SS.
2. DMS sends notification message to HA, which forwards the message to ASN-GW, then ASN-GW forwards the message to BS, which then forwards the message to SS.
3. DMS sends notification message to ASN-GW, which forwards the message to the BS, which forwards message to SS.
4. DMS sends notification message to some other entity in CSN, which forwards the message to some entity in ASN, which forwards message to SS.

5. DMS sends notification message directly to ANS-GW or some other entity in ASN, which forwards the message to BS, which forwards the message to SS.

Figure 2:
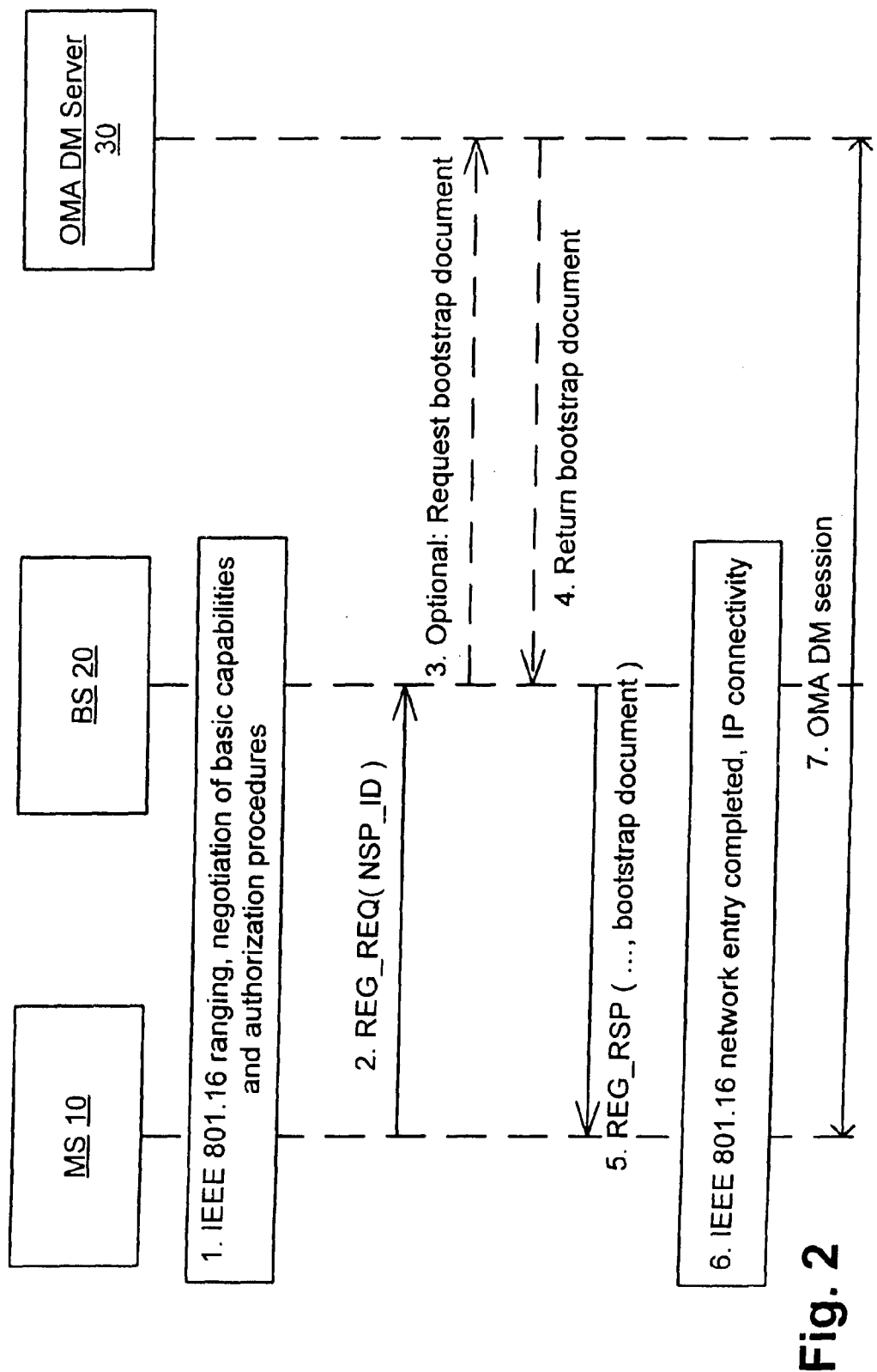
FIG. 2 shows a signaling diagram illustrating a provision of server information according to a second embodiment of the invention.

FIG. 2 shows a signaling diagram illustrating signaling between a mobile station (MS) 10, a base station (BS) 20 and an OMA DM server 30 according to the second embodiment.

In a process 1 in FIG. 2, IEEE 801.16 ranging, negotiation of basic capabilities and authorization procedures are performed between the MS 10 and the OMA DM server 30. After that, the MS 10 issues a registration request REG_REQ which may contain an NSP_ID to the BS 20 (communication 2 in FIG. 2). If the REG_REQ does not contain the ID of the NSP or new TLV, the network provides bootstrap document of the home network; if the home network is not known then the request fails. The message REG_REQ is an existing MAC message. In response to receiving the request REG_REQ, the BS 20 may request a bootstrap document from the OMA DM server 30 in communication 3 and receive the bootstrap document from the OMA DM server 30 in communication 4 in FIG. 2. Alternatively, the BS 20 gets the bootstrap document from its own configuration. In a registration response REG_RSP which is an existing MAC message the BS 20 returns the bootstrap document to the MS 10 in communication 5 in FIG. 2. The message REG_RSP contains as TLV the bootstrap document. In a process 6 the IEEE 801.16 network entry is completed and IP connectivity is established. With the bootstrap document the MS 10 is able to start the OMA DM provisioning process, i.e. to start an OMA DM session between the OMA DM server 30 and the MS 10 (communication 7 in FIG. 2).

According to the second embodiment, the MS 10 includes a device for issuing a message requesting information for enabling the MS 10 to start a settings provisioning process. The MS 10 also includes a device for receiving a response message including the information and for extracting the information for enabling the MS 10 to start the settings provisioning process. The request message and the response message are an existing MAC message pair defined in MAC layer. The response message comprises an indication of the information.

Similarly, in the second embodiment, the BS 20 includes a device for receiving the request message and a device for indicating the information in the response message and sending the response message. The BS 20 may further include a device for retrieving the information from another entity. Similarly, the another entity, e.g. the OMA DM server 30, may include a device for returning the information upon a request for retrieving the information.

In a third embodiment, the bootstrap message is sent to the SS during DHCP (Dynamic Host Control Protocol) negotiations inside some DHCP message from the DHCP server to the device. All configuration parameters like IP address and subnet mask have own well specified option structure with unique option ID which can be inserted to DHCP messages. In this embodiment new option is created for WiMAX bootstrap document. List of option IDs is maintained by Internet Assigned Numbers Authority (IANA) and process of acquiring new DHCP option is described in detail in RFC 2132, section 10. After the device has obtained the bootstrap message it can process it and initiate the OMA DM session to the DM server and finish the setting provisioning procedure.

Figure 3:
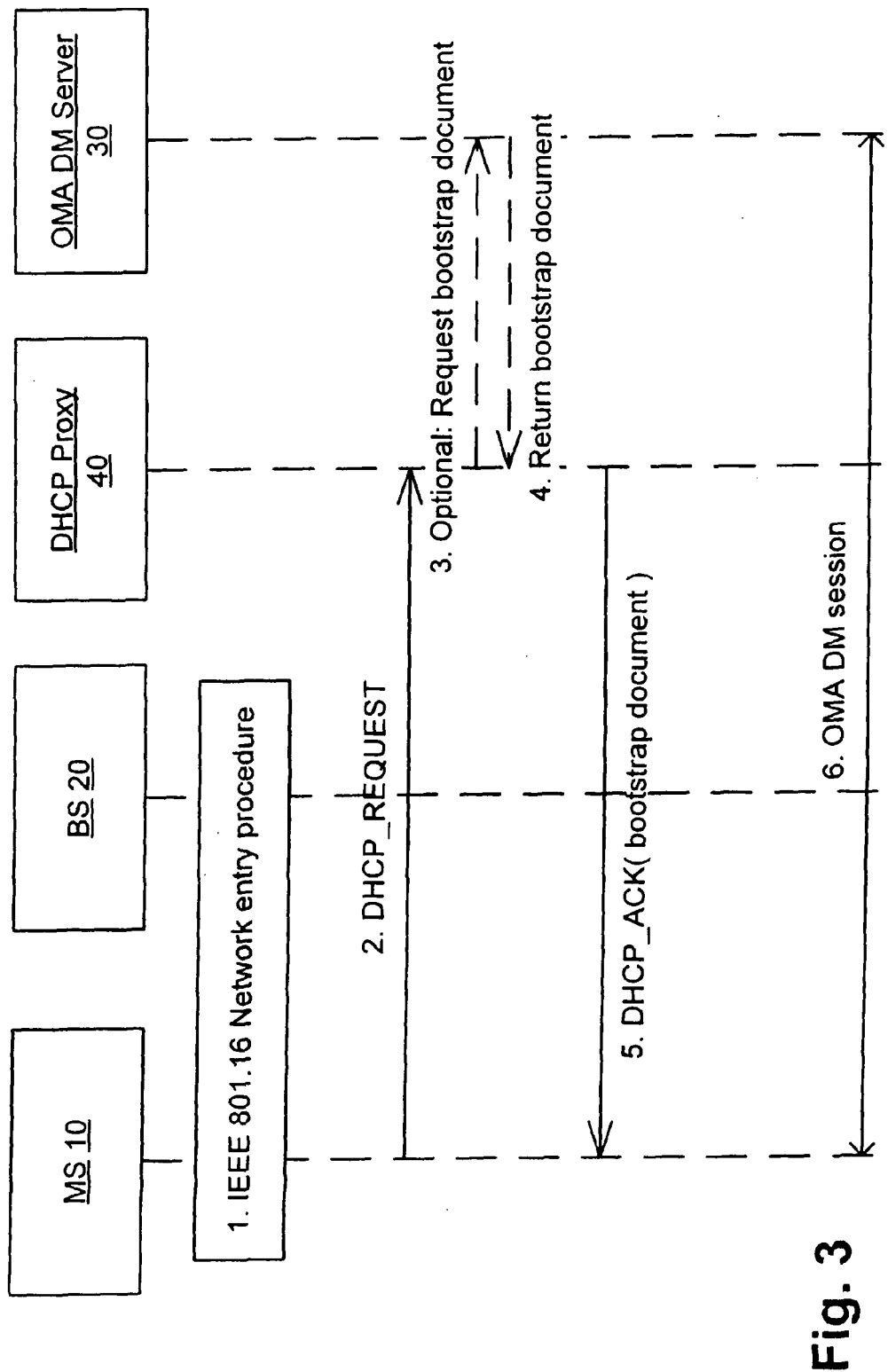
FIG. 3 shows a signaling diagram illustrating a provision of server information according to a third embodiment of the invention.

FIG. 3 shows a signaling diagram illustrating signaling between a mobile station (MS) 10 as subscriber station, a base station (BS) 20, a DHCP proxy 40 and an OMA DM server 30 according to the third embodiment.

In a process 1 in FIG. 3, IEEE 801.16 network entry procedure is performed between the MS 10 and the BS 20. After that, the MS 10 issues a request DHCP_REQUEST to the DHCP proxy 40 (communication 2 in FIG. 3). In response to receiving the request, the DHCP proxy 40 may request a bootstrap document from the OMA DM server 30 in communication 3 and receive the bootstrap document from the OMA DM server 30 in communication 4 in FIG. 3. Alternatively, the DHCP proxy 40 gets the bootstrap document from its own configuration. In an acknowledgement DHCP_ACK the DHCP proxy 40 returns the bootstrap document to the MS 10 in communication 5 in FIG. 3. Preferably, the bootstrap document is encrypted in the network element(s), e.g. in the OMA DM server 30, and decrypted at the MS 10. With the bootstrap document the MS 10 is able to start the OMA DM provisioning process, i.e. to start an OMA DM session between the OMA DM server 30 and the MS 10 (communication 6 in FIG. 3).

According to the third embodiment, the MS 10 includes a device for issuing a message requesting information for enabling the MS 10 to start a settings provisioning process. The MS 10 also includes a device for receiving a response message including the information and for extracting the information for enabling the MS 10 to start the settings provisioning process. The request message and the response message are a DHCP message pair used during DHCP negotiations. The response message comprises the information. The MS 10 may also comprise a device for decrypting the information in case it is in encrypted form.

Similarly, in the third embodiment, the DHCP proxy 40 includes a device for receiving the request message and a device for including the information in the response message and sending the response message. The DHCP proxy 40 may further include a device for retrieving the information from another entity. The information may be retrieved in encrypted form. Alternatively, the DHCP proxy 40 may include a device for encrypting the information. Similarly, the another entity, e.g. the OMA DM server 30, may include a device for returning the information upon a request for retrieving the information. The OMA DM server 30 may also include a device for encrypting the information.

In WiMAX, DHCP is transported over the ISF (Initial Service Flow) during IP address acquisition using PMIPv4 (Proxy Mobile IPv4) procedure. However, if CMIPv4 (client mobile IPv4) procedure is chosen to configure the IP address, DHCP is not used. In that latter case, with CMIP DHCP (i.e. the third embodiment) is no usable solution.

In a fourth embodiment, if CMIP is used then an optional extension field is used in a MIP registration reply message. These MIP header extensions are similar to DHCP options. Format for MIP extensions is defined in RFCs (Request For Comments). IETF (Internet Engineering Task Force) standardization process is needed to create WiMAX bootstrap extension. After that WiMAX bootstrap extension can be added to MIP message, which then can convey the OMA bootstrap message to the device. To satisfy both CMIPv4 and PMIPv4 case both c) and d) options are needed as there is no common existing protocol.

Figure 4:
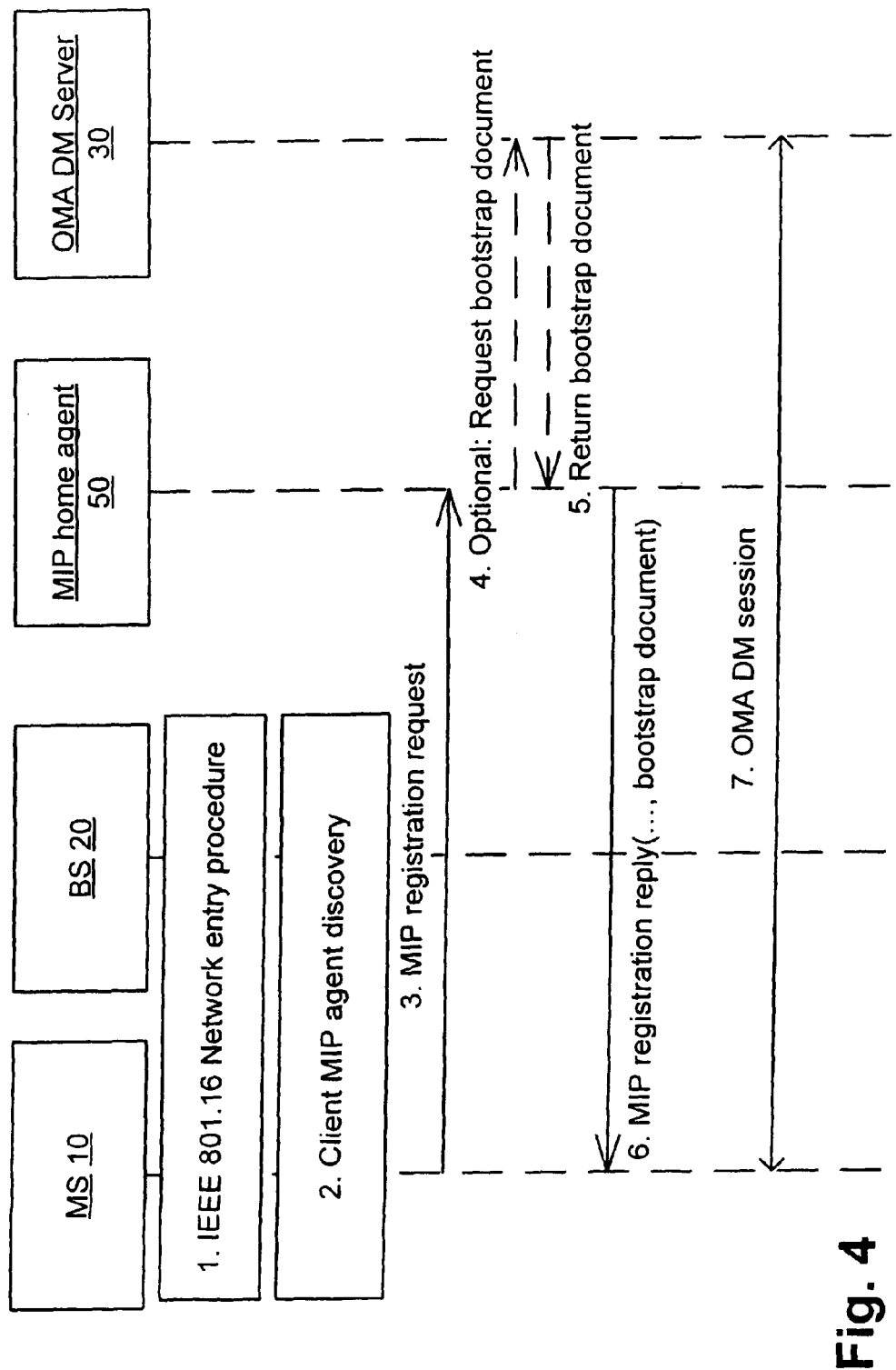
FIG. 4 shows a signaling diagram illustrating a provision of server information according to a fourth embodiment of the invention.

FIG. 4 shows a signaling diagram illustrating signaling between a mobile station (MS) 10 as subscriber station, a base station (BS) 20, a MIP home agent 50 and an OMA DM server 30 according to the fourth embodiment.

In a process 1 in FIG. 4, IEEE 801.16 network entry procedure is performed between the MS 10 and the BS 20. In a process 2, client MIP agent discovery is performed between the MS 10 and the BS 20. After that, the MS 10 issues a MIP registration request to the MIP home agent 50 (communication 3 in FIG. 2). In response to receiving the request, the MIP home agent may request a bootstrap document from the OMA DM server 30 in communication 4 and receive the bootstrap document from the OMA DM server 30 in communication 5 in FIG. 4. Alternatively, the MIP home agent 50 gets the bootstrap document from its own configuration. In a MIP registration reply the MIP home agent 50 returns the bootstrap document to the MS 10 in communication 6 in FIG. 4. Preferably, the bootstrap document is encrypted in the network element (s), e.g. in the OMA DM server 30, and decrypted at the MS 10. With the bootstrap document the MS 10 is able to start the OMA DM provisioning process, i.e. to start an OMA DM session between the OMA DM server 30 and the MS 10 (communication 7 in FIG. 4).

According to the fourth embodiment, the MS 10 includes a device for issuing a message requesting information for enabling the MS 10 to start a settings provisioning process. The MS 10 also includes a device for receiving a response message including the information and for extracting the information for enabling the MS 10 to start the settings provisioning process. The request message and the response message are a registration message pair. The response message comprises an indication of the information. The MS 10 may also include a device for decrypting the information in case it is in encrypted form.

Similarly, in the fourth embodiment, the MIP home agent 50 includes a device for receiving the request message and a device for indicating the information in the response message and sending the response message. The MIP home agent 50 may further include a device for retrieving the information from another entity. The information may be retrieved in encrypted form. Alternatively, the MIP home agent 50 may include a device for encrypting the information. Similarly, the another entity, e.g. the OMA DM server 30, may include a device for returning the information upon a request for retrieving the information. The OMA DM server 30 may also include a device for encrypting the information.

Figure 5:
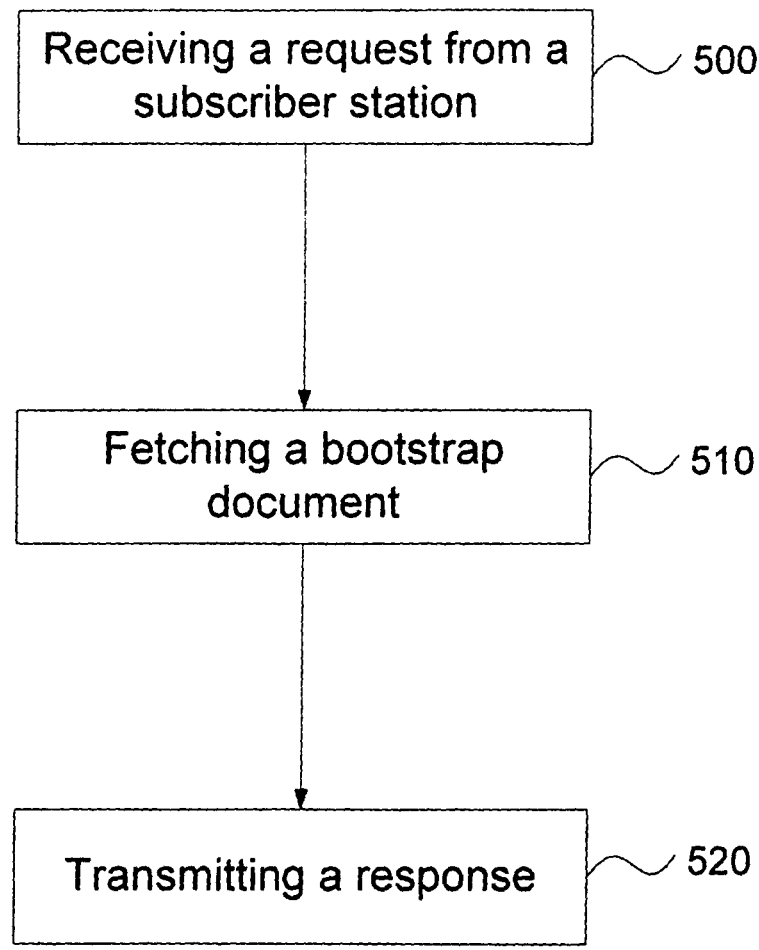
FIG. 5 shows a method according to one embodiment of the invention.

According to another embodiment of the invention, a method for enabling settings provisioning in a WiMAX network is provided. An example of the method is illustrated in FIG. 5. The method includes receiving a request from a subscriber station 500. The request may include a request for information enabling the subscriber station to begin a settings provisioning process. The method further includes fetching a bootstrap document 510, and transmitting a response to the subscriber station 520. The response may include the bootstrap document and the bootstrap document may include the information for enabling the subscriber station to begin the settings provisioning process.

For the purpose of the present invention described above, it should be noted that method steps likely to be implemented as software code portions and being run using a processor at one of the server/client entities are software code independent and can be specified using any known or future developed programming language;

method steps and/or devices likely to be implemented as hardware components at one of the server/client entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

It is to be understood that the above description is illustrative of the invention and is not to be construed as limiting the invention. Various modifications and applications may occur to those skilled in the art without departing from the true spirit and scope of the invention.

We claim:

1. A method comprising:
   receiving a request from a subscriber station at initial entry of the subscriber station into a network, wherein the request requests provisioning information for enabling the subscriber station to begin a settings provisioning process, wherein the request further comprises information for routing the provisioning information to the subscriber station through the network to be entered, and wherein the request comprises a message including information defining at least a portion of a routing path along which the provisioning information is to be directed;
   fetching a bootstrap document; and
   transmitting a response to the subscriber station, wherein the response includes the bootstrap document and the bootstrap document includes the information for enabling the subscriber station to begin the settings provisioning process, wherein the information for enabling the subscriber station to begin the settings provisioning process comprises information enabling the subscriber station to receive settings needed to begin operation in the network, and wherein transmitting the response comprises directing the response using the information for routing the provisioning information to the subscriber station through the network to be entered.

2. The method of claim 1, wherein the transmitting comprises transmitting the response using a WiMAX network.

3. The method of claim 1, wherein the receiving comprises receiving a request comprising one of a bootstrap message request, a registration request, a dynamic host control protocol (DHCP) request, and a mobile interne protocol (MIP) registration request.

4. The method of claim 1, wherein the transmitting comprises transmitting a response comprising one of a bootstrap message response, a registration response, a dynamic host control protocol (DHCP) acknowledgment, and a mobile internet protocol (MIP) registration reply.

5. The method of claim 1, wherein the receiving comprises receiving a request comprising at least one of an identification of a network service provider and a type length value indicating that the subscriber station is going to roam to the network service provider indicated by the identification.

6. The method of claim 1, wherein the transmitting comprises transmitting an encrypted response.

7. A subscriber station comprising:
   a transmitter configured to transmit, at initial entry of the subscriber station into a network, a request requesting provisioning information for enabling the subscriber station to begin a settings provisioning process to receive settings needed to begin operation in the network, wherein the request further comprises information for routing the provisioning information to the subscriber station through the network to be entered, and wherein the request comprises a message including information defining at least a portion of a routing path along which the provisioning information is to be directed; and a receiver configured to receive a response including a bootstrap document and to begin the settings provisioning process based on information contained in the bootstrap document, and wherein receiving the response comprises receiving the response directed using the information for routing the provisioning information to the subscriber station through the network to be entered.

8. The subscriber station of claim 7, wherein the request is transmitted using a WiMAX network.

9. The subscriber station of claim 7, wherein the request comprises one of a bootstrap message request, a registration request, a dynamic host control protocol (DHCP) request, and a mobile internet protocol (MIP) registration request.

10. The subscriber station of claim 7, wherein the response comprises one of a bootstrap message response, a registration response, a dynamic host control protocol (DHCP) acknowledgment, and a mobile internet protocol (MIP) registration reply.

11. The subscriber station of claim 7, wherein the request comprises at least one of an identification of a network service provider and a type length value indicating that the subscriber station is going to roam to the network service provider indicated by the identification.

12. The subscriber station of claim 7, wherein the request is transmitted to one of a base station, dynamic host control protocol (DHCP) proxy, and mobile internet protocol (MIP) home agent.

13. The subscriber station of claim 7, wherein the information contained in the bootstrap document is encrypted and the subscriber station further comprises a decrypting unit configured to decrypt the encrypted information.

14. A server comprising:
a receiver configured to receive a request for a bootstrap document including provisioning information for enabling a subscriber station to begin a settings provisioning process to receive settings needed to begin operation in a network, where the request originates at the subscriber station at initial entry of the subscriber station into the network, wherein the request further comprises information for routing the provisioning information to the subscriber station through the network to be entered, and wherein the request comprises a message including information defining at least a portion of a routing path along which the provisioning information is to be directed; and
a transmitter configured to transmit the bootstrap document to the subscriber station to enable the subscriber station to begin the settings provisioning process, wherein the bootstrap document provides information enabling the subscriber station to receive settings needed to begin operation in the network, and wherein transmitting the bootstrap document comprises directing the bootstrap document using the information for routing the provisioning information to the subscriber station through the network to be entered.

15. The server of claim 14, wherein the bootstrap document is transmitted using a WiMAX network.

16. The server of claim 14, wherein the bootstrap document is transmitted to one of a base station, dynamic host control protocol (DHCP) proxy, and mobile internet protocol (MIP) home agent.

17. The server of claim 14, wherein the request comprises at least one of an identification of a network service provider and a type length value indicating that the subscriber station is going to roam to the network service provider indicated by the identification.

18. The server of claim 14, further comprising an encrypting unit configured to encrypt the information contained in the bootstrap document.

19. A network element comprising:
a receiver configured to receive a request from a subscriber station at initial entry of the subscriber station into a network, wherein the request further comprises information for routing provisioning information to the subscriber station through the network to be entered;
a retrieving unit configured to retrieve a bootstrap document, and wherein the request comprises a message including information defining at least a portion of a routing path along which the provisioning information is to be directed; and
a transmitter configured to transmit a response to the subscriber station, wherein the response includes the bootstrap document and the bootstrap document includes information for enabling the subscriber station to begin a settings provisioning process, wherein the information for enabling the subscriber station to begin the settings provisioning process comprises information enabling the subscriber station to receive settings needed to begin operation in the network, and wherein transmitting the response comprises directing the response using the information for routing the provisioning information to the subscriber station through the network to be entered.

20. The network element of claim 19, wherein the bootstrap document is retrieved from a server.

21. The network element of claim 19, wherein the response is transmitted using a WiMAX network.

22. The network element of claim 19, wherein the request comprises one of a bootstrap message request, a registration request, a dynamic host control protocol (DHCP) request, and a mobile internet protocol (MIP) registration request.

23. The network element of claim 19, wherein the response comprises one of a bootstrap message response, a registration response, a dynamic host control protocol (DHCP) acknowledgment, and a mobile internet protocol (MIP) registration reply.

24. The network element of claim 19, wherein the request comprises at least one of an identification of a network service provider and a type length value indicating that the subscriber station is going to roam to the network service provider indicated by the identification.

25. A method comprising:
in a worldwide interoperability for microwave access (WiMAX) network that comprises an open mobile alliance device management (OMA-DM) system, receiving from a subscriber station, at initial entry of the subscriber station into the network, a subscriber station initiated request for a bootstrap document to be used by the subscriber station to initiate a settings provisioning process, wherein the request further comprises information for routing provisioning information to the subscriber station through the network to be entered;
retrieving the bootstrap document; and
transmitting the bootstrap document to the subscriber station, where the bootstrap document comprises at least an identification of a server for use by the subscriber station to initiate the settings provisioning process, wherein the identification is of a server able to provide information needed by the subscriber station to receive settings allowing the subscriber station to begin operation in the network, and wherein transmitting the bootstrap document comprises directing the bootstrap document using the information for routing the provisioning information to the subscriber station through the network to be entered.

* * * * *

UNITED STATES PATENT AND TRADEMARK OFFICE
CERTIFICATE OF CORRECTION

PATENT NO. : 8,498,265 B2
APPLICATION NO. : 11/987761
DATED : July 30, 2013
INVENTOR(S) : Tommi O. Rantanen et al.

Page 1 of 1

It is certified that error appears in the above-identified patent and that said Letters Patent is hereby corrected as shown below:

In the Claims:

In Claim 3:
Column 8, line 41, "interne" should be deleted and --internet-- should be inserted.

Signed and Sealed this
Fifteenth Day of October, 2013

Teresa Stanek Rea
*Deputy Director of the United States Patent and Trademark Office*